(12) United States Patent
Teramachi et al.

(10) Patent No.: US 9,273,722 B2
(45) Date of Patent: Mar. 1, 2016

(54) ROLLING GUIDE DEVICE

(71) Applicant: THK CO., LTD., Tokyo (JP)

(72) Inventors: Akihiro Teramachi, Tokyo (JP);
Takuya Horie, Tokyo (JP); Mitsumasa Wada, Tokyo (JP); Ayako Miyajima, Tokyo (JP); Shinya Saito, Tokyo (JP); Takeshi Shimamura, Tokyo (JP); Teruaki Ooka, Tokyo (JP); Marie Horikawa, Tokyo (JP); Hiroyuki Kimura, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 14/380,771

(22) PCT Filed: Mar. 5, 2013

(86) PCT No.: PCT/JP2013/055907
§ 371 (c)(1),
(2) Date: Aug. 25, 2014

(87) PCT Pub. No.: WO2013/133241
PCT Pub. Date: Sep. 12, 2013

(65) Prior Publication Data
US 2015/0016759 A1    Jan. 15, 2015

(30) Foreign Application Priority Data

Mar. 8, 2012    (JP) .................................. 2012-051199

(51) Int. Cl.
*F16C 29/06*    (2006.01)
*F16C 33/34*    (2006.01)
F16C 33/50    (2006.01)
*F16C 33/30*    (2006.01)

(52) U.S. Cl.
CPC ............. *F16C 29/0611* (2013.01); *F16C 29/06* (2013.01); *F16C 29/0609* (2013.01); *F16C 29/0652* (2013.01); *F16C 33/30* (2013.01); *F16C 33/34* (2013.01); *F16C 33/506* (2013.01)

(58) Field of Classification Search
CPC .. F16C 29/06; F16C 29/0602; F16C 29/0607; F16C 29/0609; F16C 29/0611; F16C 29/0633; F16C 29/0635; F16C 29/0652; F16C 29/065; F16C 29/0666; F16C 29/0647; F16C 29/0664; F16C 33/30; F16C 33/506
USPC ...................................................... 384/43–50
See application file for complete search history.

(56) References Cited

U.S. PATENT DOCUMENTS 4,832,510 A * 5/1989 Sato ................................ 384/44
6,132,093 A   10/2000 Michioka et al.
(Continued)

FOREIGN PATENT DOCUMENTS

| JP | 11-72119 A | 3/1999 |
|---|---|---|
| JP | 2006-105296 A | 4/2006 |
| JP | 2006-275135 A | 10/2006 |

OTHER PUBLICATIONS

International Search Report dated Apr. 2, 2013, issued in corresponding application No. PCT/JP2013/055907.

*Primary Examiner* — James Pilkington
(74) *Attorney, Agent, or Firm* — Westerman, Hattori, Daniels & Adrian, LLP

(57) ABSTRACT

A rolling guide device is capable of facilitating smooth circulation of rolling elements in an endless circulation path, and enhancing the accuracy of motion of a moving member relative to a track member. The moving member includes: a main body member having load rolling surfaces and return paths for the rolling elements; direction change pipes incorporating inner direction change paths and having inner peripheral guide surfaces of outer direction change paths, respectively; and lid members each being mounted on the main body member and having outer peripheral guide surfaces of the outer direction change paths. The main body member has position reference holes formed therein so as to serve as position references for the direction change pipes, respectively, whereas the direction change pipes have positioning protrusions formed thereon so as to be press-fitted into the position reference holes, respectively. Further, the direction change pipes include rotation restriction protruding portions.

6 Claims, 14 Drawing Sheets

(56) References Cited

U.S. PATENT DOCUMENTS

| | | | |
|---|---|---|---|
| 6,352,366 B1* | 3/2002 | Schneeberger et al. | 384/45 |
| 7,802,921 B2* | 9/2010 | Wu et al. | 384/44 |
| 8,403,563 B2* | 3/2013 | Kakei | 384/44 |
| 2006/0222273 A1 | 10/2006 | Kuwabara | |
| 2007/0053619 A1* | 3/2007 | Kuwabara | 384/13 |
| 2008/0292226 A1* | 11/2008 | Chen et al. | 384/15 |

* cited by examiner

ROLLING GUIDE DEVICE

TECHNICAL FIELD

The present invention relates to a rolling guide device for guiding, in a freely reciprocable manner, a movable member, such as a table, in a work table of a machine tool and a linear guide section or a curved guide section of various conveyance devices.

BACKGROUND ART

Hitherto, this type of rolling guide device includes a track member on which a rolling surface for rolling elements is formed along a longitudinal direction of the track member, and a moving member, which is assembled to the track member through intermediation of a large number of the rolling elements that roll on the rolling surface, and is configured to freely reciprocate along the track member. An endless circulation path for the rolling elements is formed in the moving member. This endless circulation path allows the moving member to move along the track member without any stroke limitation.

In a rolling guide device disclosed in JP 2006-105296 A, the moving member includes a main body member made of a metal, a plurality of circulation path modules mounted on the main body member, and a pair of lid members mounted on the main body member so as to cover the circulation path modules. Load rolling surfaces opposed to the respective rolling surfaces of the track member are formed on the main body member. The rolling elements are configured to roll in a load path defined by the rolling surface and the load rolling surface that are opposed to each other. Further, each circulation path module mounted on the main body member includes a pipe portion inserted into a through hole formed in the main body member, and a direction change portion formed at one end of the pipe portion and arranged on an end surface of the main body member in its moving direction.

A return path for the rolling elements is formed in the pipe portion in parallel to the load path, whereas an inner direction change path for connecting the return path and the load path is formed in the direction change portion. Further, an inner peripheral guide surface of an outer direction change path intersecting with the inner direction change path is formed on an outer surface of the direction change portion. When the lid member is mounted on the main body member so as to cover the circulation path module, the outer direction change path is formed between the direction change portion and the lid member.

The endless circulation path for the rolling elements is formed by a pair of circulation path modules in combination, and the pair of circulation path modules is mounted on the main body member so as to be opposed to each other. At this time, the pipe portions of the respective circulation path modules are inserted into different through holes formed in the main body member, and the distal end of each pipe portion protrudes through the main body member so as to be connected to the outer direction change path formed by the direction change portion of the opposing circulation path module. That is, the endless circulation path looped in an order of the load path, the inner direction change path, the return path, the outer direction change path, and the load path is formed by the pair of circulation path modules in combination. Further, the inner direction change path and the outer direction change path intersect with each other at each direction change portion, and thus two endless circulation paths are formed.

CITATION LIST

Patent Literature

[PTL 1] JP 2006-105296 A

DISCLOSURE OF THE INVENTION

Problems to be Solved Invention

To smoothly circulate the rolling elements inside the moving member and reduce resistance to the movement of the moving member relative to the track member, the rolling elements need to smoothly enter the direction change path from the load path. Therefore, the circulation path module needs to be positioned relative to the main body member with high accuracy. In particular, the circulation path module needs to be positioned relative to the load rolling surface of the main body member with high accuracy.

In the rolling guide device of JP 2006-105296 A, however, the pipe portion of the circulation path module is inserted into the through hole of the main body member so that the circulation path module is positioned relative to the main body member. The through hole cannot function as a reference of positioning of the circulation path module relative to the main body member, thereby being difficult to enhance the accuracy of positioning of the circulation path module relative to the load rolling surface of the main body member. The reason therefor is as follows. That is, the load rolling surface is formed by grinding after the main body member is quenched, but the through hole, into which the pipe portion of the circulation path module is to be inserted, is formed before the main body member is quenched in consideration of easiness of processing. A strain generated in the main body member due to heat treatment to be carried out after the quenching degrades the positional accuracy itself of the through hole relative to the load rolling surface. For this reason, resistance is liable to act on the circulation of the rolling elements, and particularly in application in which the moving member is moved at high speed relative to the track member, there is a risk in that the motion of the moving member is degraded.

Means for Solving the Problems

The present invention has been made in view of the above-mentioned problems, and has an object to provide a rolling guide device capable of facilitating smooth circulation of rolling elements in an endless circulation path, and enhancing the accuracy of motion of a moving member relative to a track member.

That is, according to one embodiment of the present invention, there is provided a rolling guide device, including: a track member; and a moving member assembled to the track member through intermediation of a large number of rolling elements, the moving member having a plurality of rolling-element endless circulation paths including inner direction change paths and outer direction change paths intersecting with each other. The moving member includes: a main body member having load rolling surfaces and return paths for the large number of rolling elements; direction change pipes incorporating the inner direction change paths and having inner peripheral guide surfaces of the outer direction change paths, respectively; and lid members each being mounted on the main body member and having outer peripheral guide surfaces of the outer direction change paths.

Further, the main body member, to which the direction change pipes are fixed, has position reference holes formed therein so as to serve as position references for the direction change pipes, respectively. The direction change pipes have positioning protrusions formed thereon so as to be press-fitted into the position reference holes, respectively. Further, the direction change pipes include rotation restriction protruding portions formed on outer wall portions of the inner direction change paths, respectively, for preventing rotation of the direction change pipes about the respective positioning protrusions when the lid members are fixed to the main body member.

Effects of the Invention

According to one embodiment of the present invention, the positioning protrusion formed on the direction change pipe is press-fitted into the position reference hole formed in the main body member, and hence the direction change pipe is mounted at a proper position on the main body member with only a degree of freedom of rotation about the positioning protrusion. On the other hand, the rotation restriction protruding portion is formed on the outer wall portion of the inner direction change path of the direction change pipe, and hence, when the lid member is mounted on the main body member, the lid member locks the rotation restriction protruding portion, to thereby restrict the rotation of the direction change pipe about the positioning protrusion. Thus, the direction change path formed in the direction change pipe is positioned with high accuracy relative to the load rolling surface of the main body member, thereby being capable of facilitating smooth circulation of the rolling elements in the endless circulation path, and enhancing the accuracy of the motion of the moving member relative to the track member.

MODE FOR CARRYING OUT THE INVENTION

Now, a rolling guide device of the present invention is described in detail with reference to the accompanying drawings.

Figure 1:
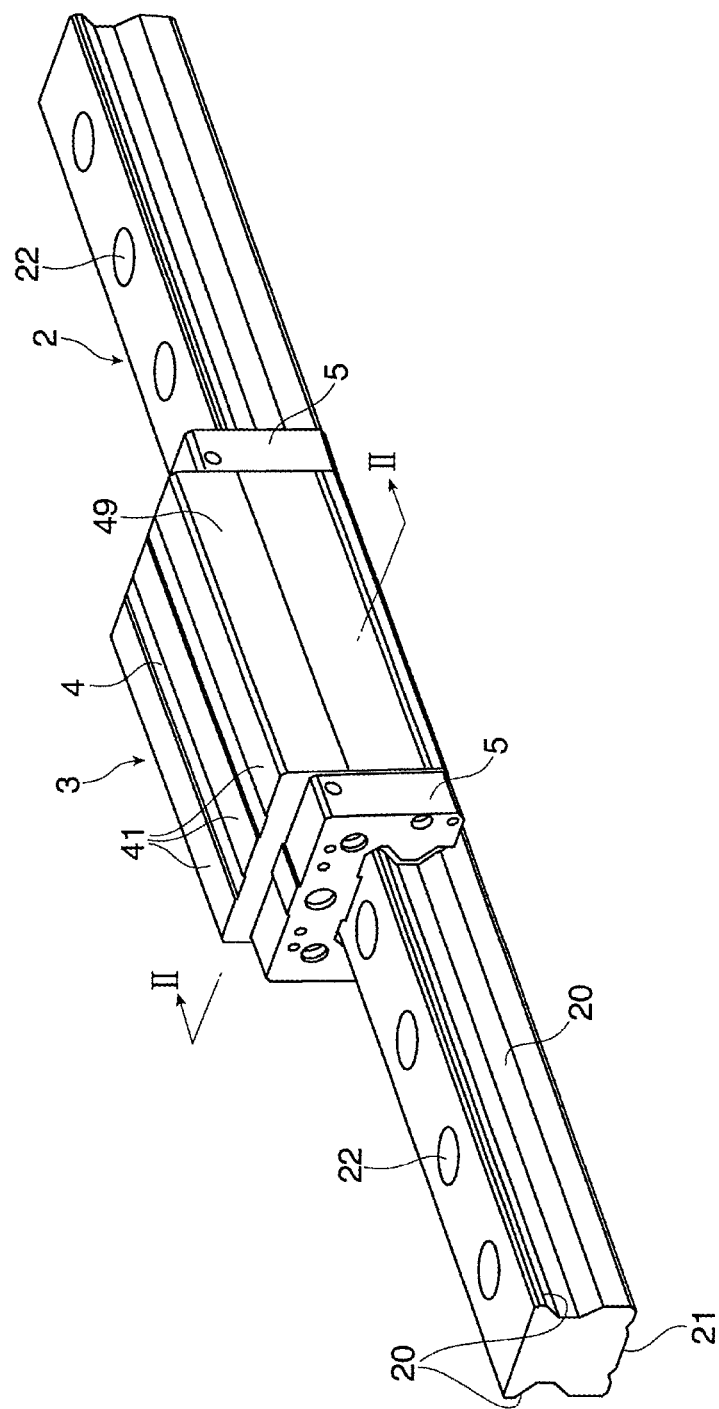
FIG. 1 is a perspective view illustrating a rolling guide device according to a first embodiment to which the present invention is applied.
Figure 2:
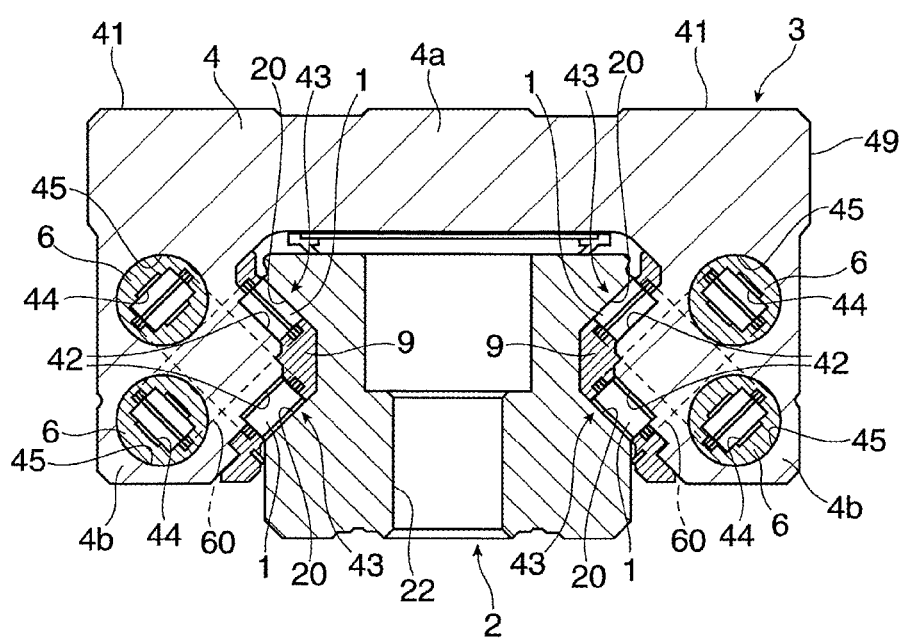
FIG. 2 is a sectional view taken along the line II-II of FIG. 1.

FIGS. 1 and 2 illustrate a rolling guide device according to a first embodiment to which the present invention is applied. The rolling guide device includes a track member 2 on which rolling surfaces 20 for rollers 1 serving as rolling elements are formed along a longitudinal direction of the track member 2, and a moving member 3, which is assembled to the track member 2 through intermediation of a large number of the rollers 1, and incorporates endless circulation paths for the rollers 1. The rollers 1 are configured to roll along each of the rolling surfaces 20 of the track member 2 while circulating inside the corresponding endless circulation path, and thus the moving member 3 is freely movable along the longitudinal direction of the track member 2. Note that, balls may be used as the rolling elements for the rolling guide device of the present invention.

The track member 2 is formed into a substantially rectangular shape in cross section, and recessed portions are formed in both side surfaces thereof. The rolling surfaces 20 for the rollers 1 are formed above and below each recessed portion, and four rolling surfaces 20 are formed in the entire track member 2. Each rolling surface 20 is inclined at an angle of 45° relative to a bottom surface 21 of the track member 2. The rolling surface 20 positioned above the recessed portion faces obliquely downward at an angle of 45°, whereas the rolling surface 20 positioned below the recessed portion faces obliquely upward at an angle of 45°. Further, fixing holes 22 for fixing bolts are formed in the track member 2 at predetermined intervals along the longitudinal direction, and are used when the track member 2 is to be laid on machinery or the like. Note that, the arrangement of the rolling surfaces 20 on the track member 2, the inclination angle of the rolling surfaces 20 relative to the track member 2, and the number of the rolling surfaces 20 may be changed as appropriate depending on bearing capacity necessary for the moving member 3.

On the other hand, the moving member 3 includes a main body member 4 having a guide groove for receiving a part of the track member 2, a pair of lid members 5 mounted in the front and rear of the main body member 4 in its moving direction, and circulation path modules 6 mounted on the main body member 4 and covered with the lid members 5 from the outside. Note that, details of the circulation path modules 6 are described later.

The main body member 4 includes a horizontal portion 4a, on which a mounting surface 41 for machinery or the like is formed, and a pair of leg portions 4b orthogonal to the horizontal portion 4a. The main body member 4 is arranged on the track member 2 so as to straddle across the track member 2. The mounting surface 41 is formed on the horizontal portion 4a, whereas two load rolling surfaces 42 for allowing the rollers 1 to roll therealong are formed on an inner side of each leg portion 4b. Each rolling surface 20 of the track member 2 and each load rolling surface 42 of the main body member 4 are opposed to each other, to thereby define a load path 43 for allowing the rollers 1 to roll therealong while bearing loads between the main body member 4 and the track member 2. A return path 44 corresponding to each load rolling surface 42 is formed in each leg portion 4b in parallel to the load path 43, and the rollers 1 that have rolled along the load path 43 and are released from the loads then roll along the return path 44 in a direction opposite to the rolling direction in the load path 43. The return path 44 is formed in each circulation path module 6. A part of the circulation path module 6 is inserted into a through hole 45 formed in the main body member 4, and thus the return path 44 is formed in the main body member 4.

Further, the circulation path modules 6 define, together with the lid members 5, direction change paths 60 for connecting the load path 43 and the return path 44. A pair of direction change paths 60 connects both ends of each load path 43 described above and both ends of the return path 44 corresponding to the load path 43, to thereby define the endless circulation path for the rollers 1 inside the moving member 3. As indicated by the broken lines of FIG. 2, the direction change paths 60 connect each load path 43 to the return path 44 positioned obliquely below or above the load path 43, and the direction change paths 60 of the two endless circulation paths defined in each leg portion 4b of the main body member 4 intersect with each other.

Figure 3:
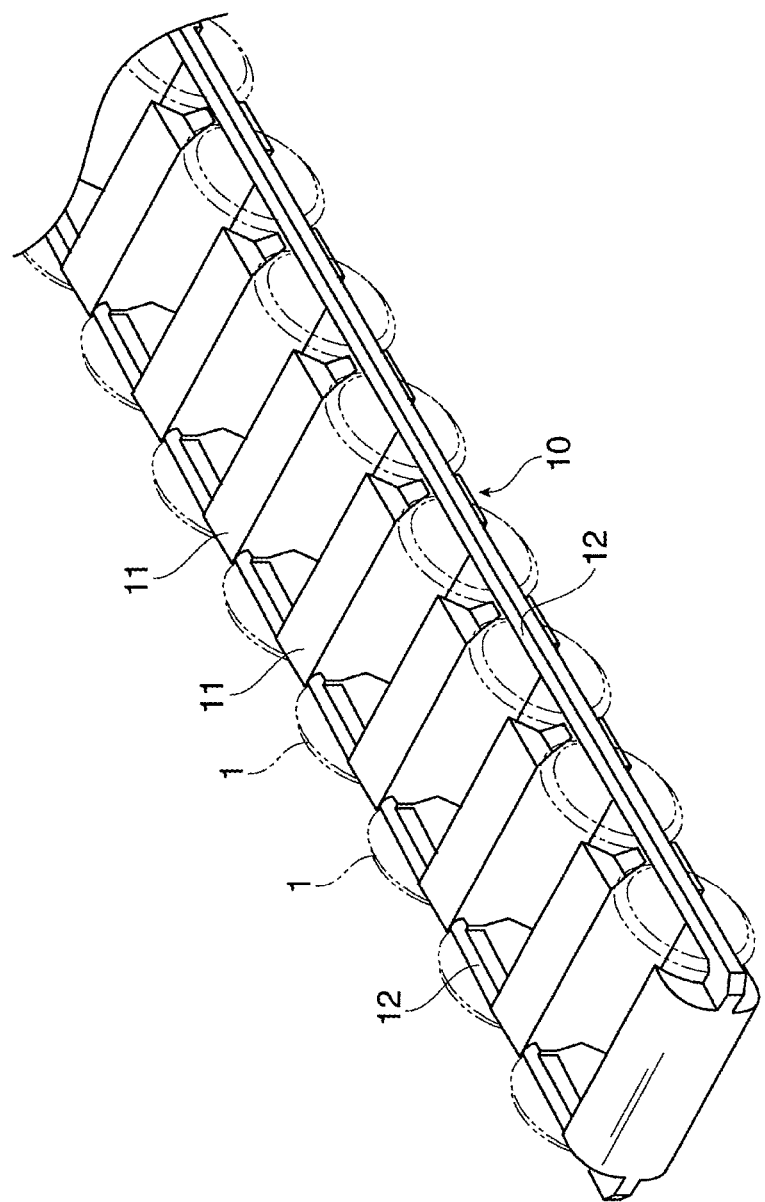
FIG. 3 is a perspective view illustrating a coupler belt having rollers arrayed as rolling elements.

As illustrated in FIG. 3, the rollers 1 are arrayed in line at regular intervals on a flexible coupler belt 10, and are assembled into the endless circulation path together with the coupler belt 10. The coupler belt 10 is formed by injection molding using a synthetic resin, and includes a plurality of spacers 11 each being interposed between the roller 1 and the roller 1, and belt portions 12 having the spacers 11 coupled in line. Note that, the rollers 1 may be inserted into the endless circulation path without being arrayed on the coupler belt 10.

Figure 4:
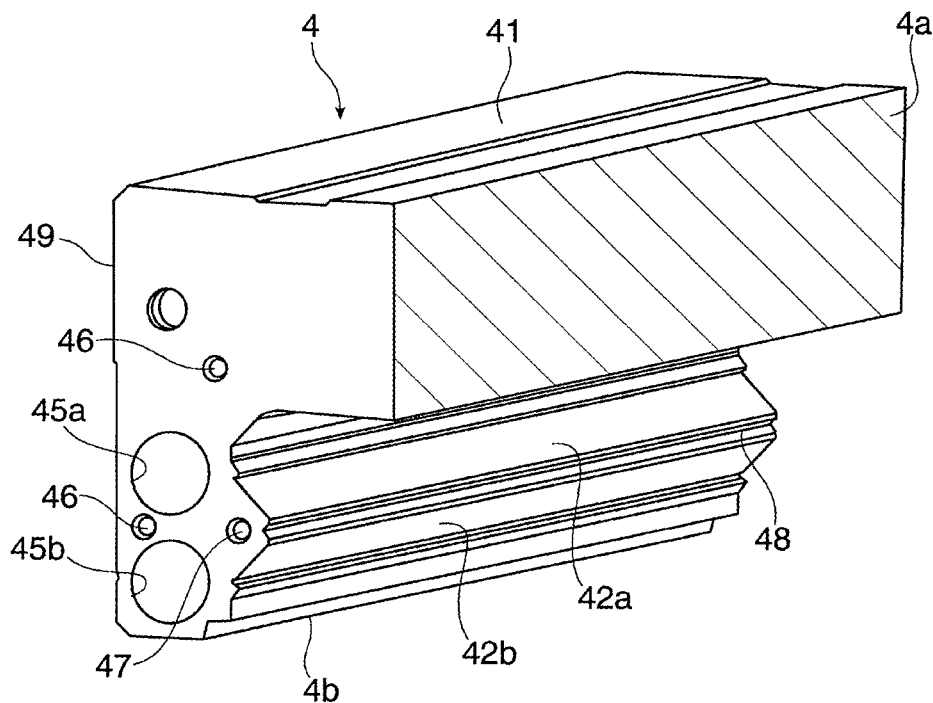
FIG. 4 is a perspective view illustrating a main body member of the rolling guide device according to the first embodiment.

FIG. 4 is a view illustrating a state in which the lid members 5 and the circulation path modules 6 are removed from the moving member 3. FIG. 4 is a view of the main body member 4 cut into a half at the horizontal portion 4a, for illustrating one of the leg portions 4b alone. As understood from FIG. 4, an upper load rolling surface 42a and a lower load rolling surface 42b are formed on an inner surface of the leg portion 4b of the main body member 4. Further, a lower through hole 45b corresponding to the upper load rolling surface 42a and an upper through hole 45a corresponding to the lower load rolling surface 42b are formed in the leg portion 4b. Parts of the circulation path modules 6 are inserted into the upper through hole 45a and the lower through hole 45b, respectively, to thereby define the return paths 44.

Further, female screw holes 46 for fastening fixing bolts passing through the lid member 5 and a position reference hole 47 for the circulation path module 6 are formed in each end surface of the main body member 4 on which the lid member 5 is to be mounted. The position reference hole 47 is positioned in a region surrounded by the upper load rolling surface 42a, the lower load rolling surface 42b, the upper through hole 45a, and the lower through hole 45b. Still further, a locking groove 48 having a V-shape in cross section is formed in the inner surface of the leg portion 4b at an intermediate position between the upper load rolling surface 42a and the lower load rolling surface 42b. A central holding member 9 (see FIG. 2) for guiding the coupler belt 10 in the load path 43 is positioned relative to the upper load rolling surface 42a and the lower load rolling surface 42b by utilizing the locking groove 48.

Figure 5:
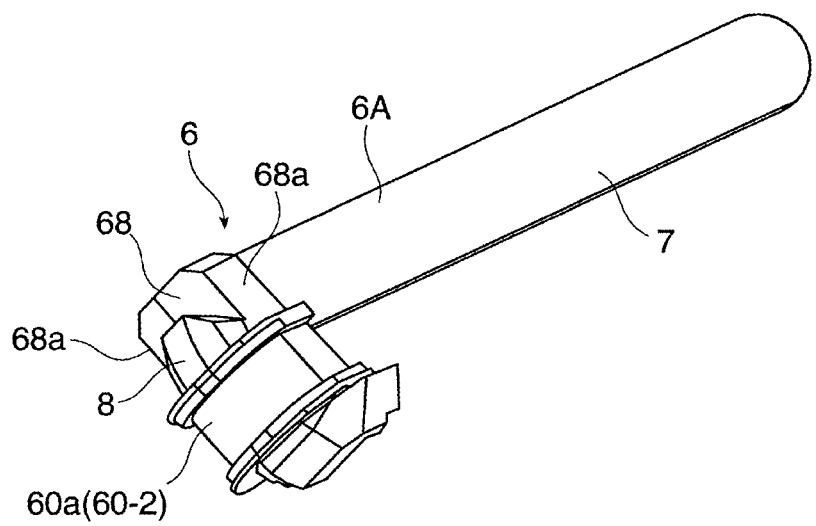
FIG. 5 is a perspective view illustrating a circulation path module of the rolling guide device according to the first embodiment.
Figure 6:
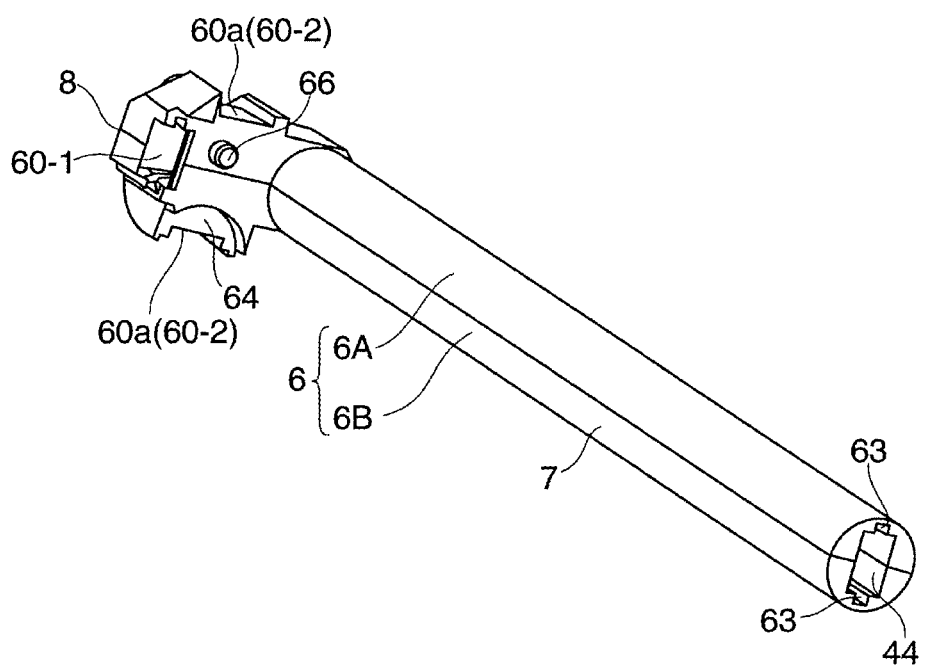
FIG. 6 is a perspective view illustrating the circulation path module of FIG. 5 as seen from a different angle.

FIGS. 5 and 6 are perspective views illustrating the circulation path module 6. The circulation path module 6 includes a return path pipe 7 to be inserted into the through hole 45a or 45b of the main body member 4 and having the return path 44 formed therein, and a direction change pipe 8 for defining the direction change path 60. The return path pipe 7 and the direction change pipe 8 are integrated with each other by injection molding using a synthetic resin. The entire length of the return path pipe 7 is set slightly larger than the length of the through hole 45a or 45b formed in the main body member 4. Note that, the return path pipe 7 and the direction change pipe 8 do not need to be integrated with each other, but may be formed separately and then assembled when being mounted on the main body member 4.

The direction change pipe 8 incorporates an inner direction change path 60-1 curved into a substantially U-shape. The inner direction change path 60-1 is continuous with the return path 44 formed in the return path pipe 7. Further, as illustrated in FIG. 5, on an outer wall portion of the direction change pipe 8, an inner peripheral guide surface 60a of an outer direction change path 60-2 is formed into an arch-like shape. The outer direction change path 60-2 is formed so as to guide the rollers 1 in a direction intersecting with that of the inner direction change path 60-1, and the inner peripheral guide surface 60a intersects with the inner direction change path 60-1 so as to straddle across the outer wall portion of the direction change pipe 8. Further, as illustrated in FIG. 6, an abutment recessed portion 64 on which a distal end surface of the return path pipe of another circulation path module 6 is brought into abutment is formed in an inner surface of the direction change pipe 8. One end of the inner peripheral guide surface 60a is opened at the abutment recessed portion 64.

As illustrated in FIG. 5, a rotation restriction protruding portion 68 for positioning the direction change pipe 8 when the lid member 5 is mounted on the main body member 4 is formed on the outer wall portion of the direction change pipe 8. The rotation restriction protruding portion 68 is formed integrally with the outer wall portion of the direction change pipe 8 in the vicinity of a connection portion between the direction change pipe 8 and the return path pipe 7 so as to cover an outer peripheral portion of the direction change pipe, which has been formed into a cylindrical shape in the related art. The rotation restriction protruding portion 68 has a pair of restriction surfaces 68a formed in parallel to each other so as to sandwich the direction change pipe 8, and the pair of restriction surfaces 68a has a substantially rectangular outer shape.

On the other hand, as illustrated in FIG. 6, a positioning protrusion 66 to be fitted into the above-mentioned position reference hole 47 of the main body member 4 is formed on the direction change pipe 8. The positioning protrusion 66 is located at an intersection position between the inner direction change path 60-1 and the outer direction change path 60-2, and is formed into a columnar shape having an outer diameter slightly larger than an inner diameter of the position reference hole 47.

Figure 7:
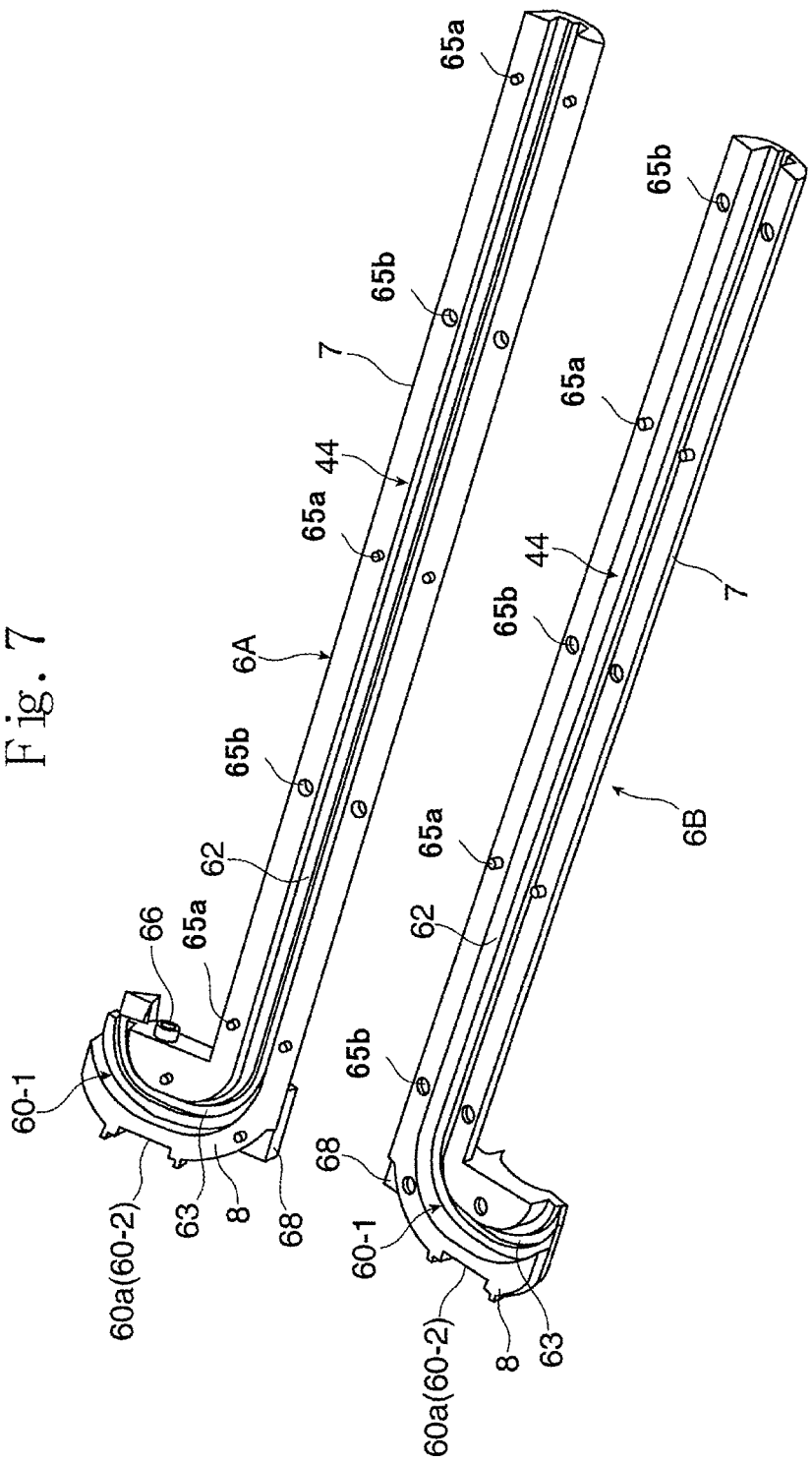
FIG. 7 is an exploded perspective view illustrating the circulation path module according to the first embodiment.

FIG. 7 is an exploded perspective view illustrating the circulation path module. The circulation path module 6 is divided into a first half circulation segment 6A and a second half circulation segment 6B, and a division plane therebetween includes a center line of each of the return path 44 and the inner direction change path 60-1. Thus, rolling element guide grooves 62 serving as the return path 44 and the inner direction change path 60-1 are formed in the first half circulation segment 6A and the second half circulation segment 6B, respectively, and each of the rolling element guide grooves 62 is continuously formed as a single groove extending from the return path pipe 7 to the direction change pipe 8. Further, a guide groove 63 for receiving the belt portion 12 of the coupler belt 10 is formed in a bottom portion of each of the rolling element guide grooves 62. Still further, the circulation path module 6 is divided into the first half circulation segment 6A and the second half circulation segment 6B so as to be cut across the middle of the inner peripheral guide surface 60a of the outer direction change path 60-2, which is formed into the arch-like shape on the outer surface of the direction change pipe 8.

Protrusions 65a and holes 65b to be fitted together are formed on the first half circulation segment 6A and the second half circulation segment 6B, respectively. When the protrusions 65a and the holes 65b are fitted together, the second half circulation segment 6B is accurately combined with the first half circulation segment 6A, to thereby complete the circulation path module 6 having the return path 44 and the inner direction change path 60-1.

Figure 8:
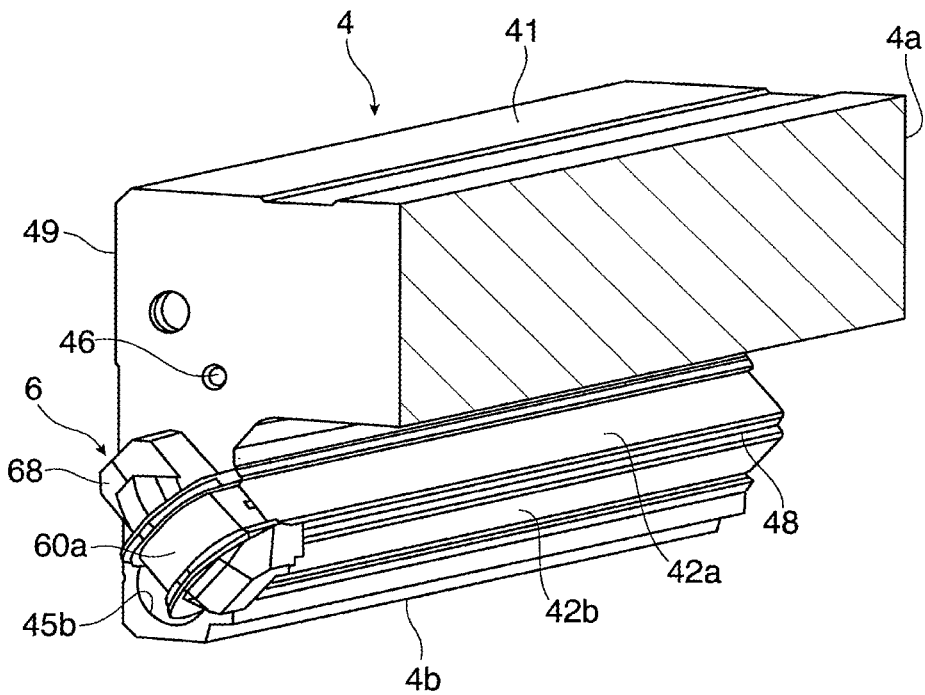
FIG. 8 is a perspective view illustrating a state in which the circulation path module is mounted on the main body member.

FIG. 8 is a perspective view illustrating a state in which the circulation path module 6 is mounted on the leg portion 4b of the main body member 4. FIG. 8 illustrates a state in which the return path pipe 7 of the circulation path module 6 is inserted into the upper through hole 45a of the leg portion 4b. The length of the return path pipe 7 is set slightly larger than the length of the main body member 4 in its moving direction (in the longitudinal direction of the track member 2). When the return path pipe 7 is inserted into the through hole 45a until the direction change pipe 8 is brought into contact with the leg portion 4b, although the illustration is omitted in FIG. 8, a distal end of the return path pipe 7 slightly protrudes from an opposite surface of the leg portion 4b. In this state, the inner direction change path 60-1 incorporated into the direction change pipe 8 is connected to the lower load rolling surface 42b formed on the main body member 4, and the inner peripheral guide surface 60a of the outer direction change path 60-2 formed in the direction change pipe 8 is connected to the upper load rolling surface 42a of the main body member 4. FIG. 8 illustrates one end surface of the leg portion 4b having the circulation path module 6 mounted thereon, and another circulation path module 6 is similarly mounted on the opposite end surface of the leg portion 4b.

Figure 9:
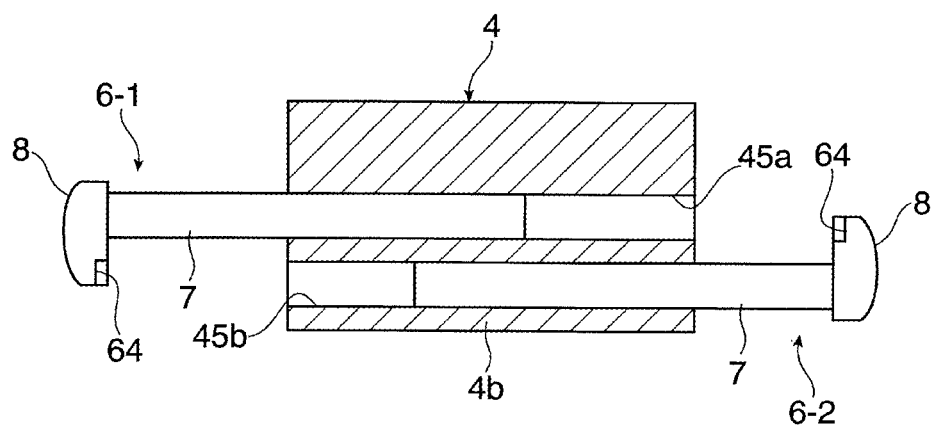
FIG. 9 is a schematic view illustrating a procedure of assembling a pair of circulation path modules to the main body member.
Figure 10:
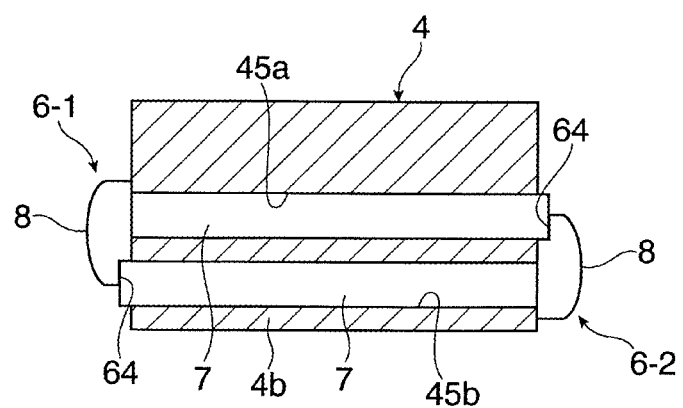
FIG. 10 is a schematic view illustrating a state in which the pair of circulation path modules is combined with the main body member.

FIGS. 9 and 10 are schematic views simply illustrating a state in which a pair of circulation path modules 6-1 and 6-2 is mounted on the leg portion 4b from the front and rear of the main body member 4 in its moving direction. As illustrated in FIG. 9, the return path pipes 7 of the pair of circulation path modules 6-1 and 6-2 are inserted in different directions into the upper through hole 45a and the lower through hole 45b formed in the main body member 4, respectively. In this case, the circulation path module 6-1 inserted into the upper through hole 45a and the circulation path module 6-2 inserted into the lower through hole 45b are members having the same shape, but the insertion directions toward the leg portion 4b are opposite to each other, and the circulation path module 6-2 is vertically inverted relative to the circulation path module 6-1. FIG. 10 is a schematic view illustrating a state in which the pair of circulation path modules 6-1 and 6-2 has been mounted on the leg portion 4b. Under the state in which the circulation path modules 6-1 and 6-2 have been mounted on the leg portion, the distal end of the return path pipe 7 of each of the circulation path modules 6-1 and 6-2 slightly protrudes from the leg portion 4b through the upper through hole 45a or the lower through hole 45b, and abuts on the abutment recessed portion 64 of the direction change pipe 8, which is positioned so as to be opposed to the distal end of the return path pipe 7. Thus, the pair of circulation path modules 6-1 and 6-2 is combined across the leg portion 4b. Further, the main body member 4 includes the pair of leg portions 4b, and hence four circulation path modules are mounted on the main body member 4.

Figure 11:
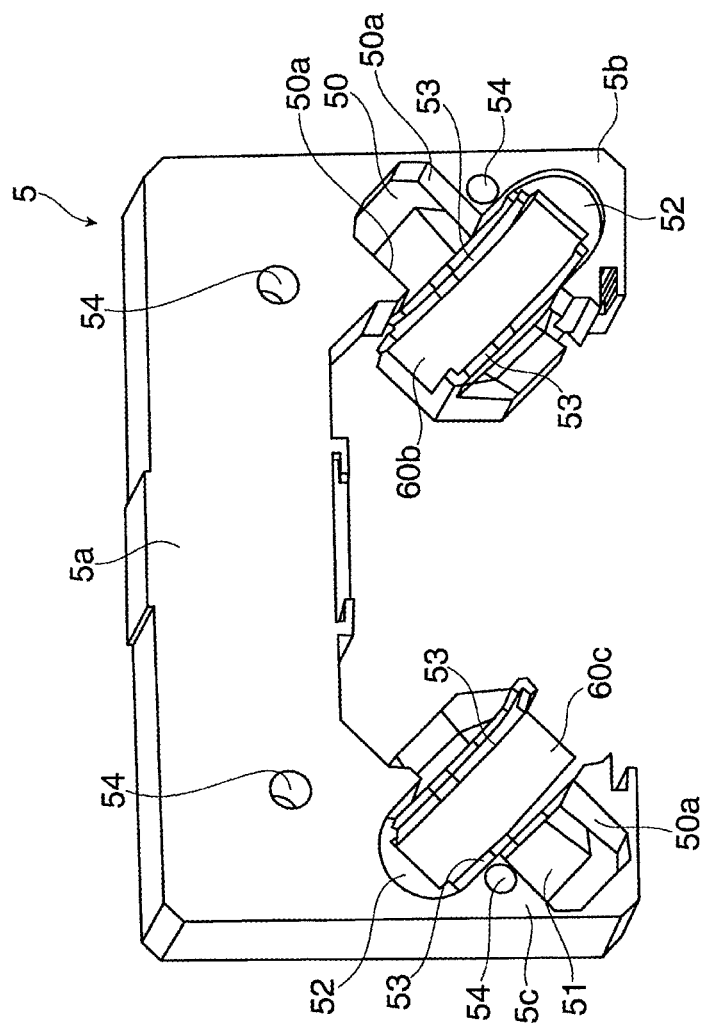
FIG. 11 is a perspective view illustrating a lid member of the rolling guide device according to the first embodiment.

FIG. 11 is a perspective view illustrating the lid member 5 to be mounted on the main body member 4 so as to cover the direction change pipes 8 of the circulation path modules 6. FIG. 11 illustrates the lid member 5 as seen from the main body member 4 side. The lid member 5 is manufactured by injection molding using a synthetic resin, and includes a mounting portion 5a corresponding to the horizontal portion 4a of the main body member 4, and a pair of leg portions 5b and 5c corresponding to the leg portions 4b of the main body member 4. Receiving grooves 50 and 51 for receiving the direction change pipes 8 of the circulation path modules 6 are formed in inner surfaces of the leg portions 5b and 5c, respectively, which are to be brought into abutment on the main body member 4. In this case, the receiving groove 50 formed in the leg portion 5b corresponds to the circulation path module 6 mounted on the main body member 4 in FIG. 8. Further, the receiving groove 51 formed in the leg portion 5c is oriented in a direction different by 180° from that of the receiving groove 50 formed in the leg portion 5b, and corresponds to the circulation path module 6 mounted on the leg portion 4b of the main body member 4 from an opposite side (far side of the drawing sheet) in FIG. 8.

Further, outer peripheral guide surfaces 60b and 60c corresponding to the inner peripheral guide surfaces 60a of the circulation path modules 6 are formed into a recessed curve surface shape on the inner surfaces of the leg portions 5b and 5c, respectively. The outer peripheral guide surfaces 60b and 60c are formed so as to intersect with the receiving grooves 50 and 51 in the respective leg portions 5b and 5c. Note that, the outer peripheral guide surface 60c formed on the leg portion 5c is oriented in a direction different by 180° from that of the outer peripheral guide surface 60b formed on the leg portion 5b.

A positioning recessed portion 52 on which the distal end surface of the return path pipe 7 of the circulation path module 6 is brought into abutment is formed in each of the leg portions 5b and 5c of the lid member 5. One end of each of the outer peripheral guide surfaces 60b and 60c is opened at the positioning recessed portion 52. Further, on both sides of each of the outer peripheral guide surfaces 60b and 60c, stepped portions 53 are formed along a longitudinal direction of each of the outer peripheral guide surfaces 60b and 60c. When the direction change pipe 8 of the circulation path module 6 is received in each of the receiving grooves 50 and 51, the stepped portions 53 serve as guide grooves for receiving the belt portions 12 of the coupler belt 10. Note that, reference symbol 54 of FIG. 11 represents a through hole for a fixing bolt to be used for fastening the lid member 5 to the main body member 4.

Each of the receiving grooves 50 and 51 has a shape conforming to that of the rotation restriction protruding portion 68 formed on the direction change pipe 8. A pair of opposing locking surfaces 50a is formed in each of the receiving grooves 50 and 51. The locking surfaces 50a correspond to the pair of restriction surfaces 68a formed on the rotation restriction protruding portion 68 of the direction change pipe 8. When the direction change pipe 8 is received in each of the receiving grooves 50 and 51, the restriction surfaces 68*a* and the locking surfaces 50*a* abut on each other.

Figure 12:
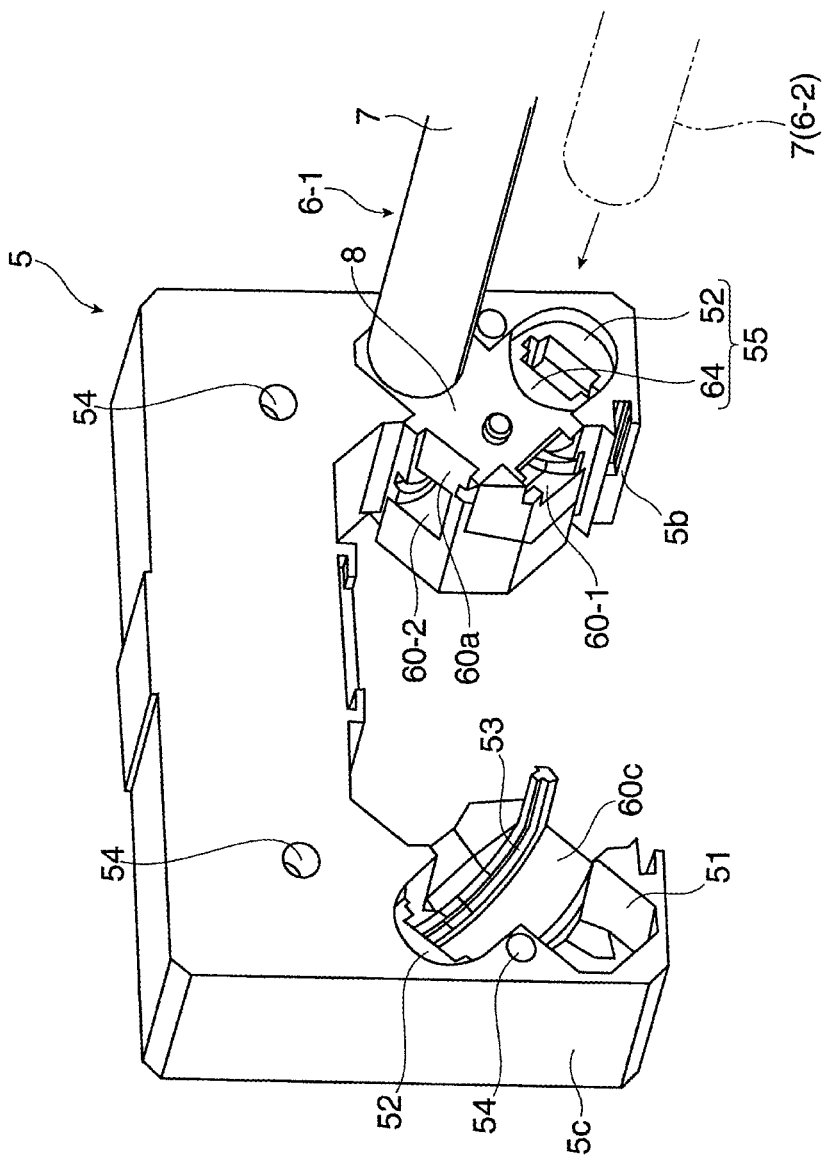
FIG. 12 is a perspective view illustrating a state in which the circulation path module is mounted on the lid member.

FIG. 12 is a perspective view illustrating a state in which the circulation path module 6-1 illustrated in FIG. 9 and the lid member 5 are combined with each other. FIG. 12 illustrates a state in which the direction change pipe 8 of the circulation path module 6-1 is received in the receiving groove 50 on one side of the lid member 5. When the direction change pipe 8 is received in the receiving groove 50 of the lid member 5 as described above, the outer peripheral guide surface 60*b* of the lid member 5 and the inner peripheral guide surface 60*a* of the direction change pipe 8 are opposed to each other, to thereby complete the outer direction change path 60-2. At this time, the return path pipe 7 formed in the circulation path module 6-1 is inserted into the upper through hole 45*a* formed in the leg portion 4*b* of the main body member 4. Further, when the direction change pipe 8 is received in the receiving groove 50 of the lid member 5, the abutment recessed portion 64 formed in the direction change pipe 8 and the positioning recessed portion 52 formed in the lid member 5 are combined with each other, to thereby form a pipe receiving hole 55 having a substantially circular shape. The distal end of the return path pipe 7 of the other circulation path module 6-2, which protrudes from the lower through hole 45 formed in the leg portion 4*b* of the main body member 4, is fitted into the pipe receiving hole 55 in the arrow direction of FIG. 12. Thus, the outer direction change path 60-2 is connected to the return path 44 of the other circulation path module 6-2.

Further, the direction change pipe 8 of the circulation path module 6 is also received in the receiving groove 51 on the other side of the lid member 5, but the circulation path module 6 received in the receiving groove 51 has such a posture as to be vertically inverted relative to the circulation path module 6 received in the above-mentioned receiving groove 50. Note that, the pair of lid members 5 mounted on the main body member 4 from both sides in its moving direction corresponds to the lid members of FIG. 11 that are arranged so as to be opposed to each other, and hence the pair of lid members 5 has the same shape.

Further, the moving member 3 is completed by combining four circulation path modules 6 having the same shape and two lid members 5 having the same shape with the main body member 4 as described above. Two endless circulation paths for the rollers 1 are formed in each leg portion 4*b* of the main body member 4. That is, the inner direction change path 60-1 and the outer direction change path 60-2 are positioned at both ends of the upper load rolling surface 42*a* and both ends of the lower load rolling surface 42*b* of each leg portion 4*b*, and the inner direction change path 60-1 and the outer direction change path 60-2 are connected to each other through the return path 44 formed in the upper through hole 45*a* or the lower through hole 45*b* of the main body member 4.

When combining the main body member 4, the circulation path modules 6, and the lid members 5 as described above so as to define the endless circulation paths for the rollers 1, in order to secure smooth circulation of the rollers 1 in the endless circulation paths, it is important that inlets of the inner direction change path 60-1 and the outer direction change path 60-2 be positioned with high accuracy relative to the load rolling surfaces 42*a* and 42*b* formed on the main body member 4. Particularly in the rolling guide device of this embodiment, the positioning of the direction change pipes 8 of the circulation path modules 6 relative to the main body member 4 is important.

Therefore, in the rolling guide device of the first embodiment, when each of the circulation path modules 6 is to be mounted on the main body member 4, the positioning protrusion 66 formed on the direction change pipe 8 is fitted into the position reference hole 47 formed in the leg portion 4*b* of the main body member 4. As described above, the outer diameter of the positioning protrusion 66 is set slightly larger than the inner diameter of the position reference hole 47, and hence the positioning protrusion 66 is press-fitted into the position reference hole 47, to thereby prevent displacement of the positioning protrusion 66 in the position reference hole 47.

Further, in order to enhance the positional accuracy of the position reference hole 47 relative to the upper load rolling surface 42*a* and the lower load rolling surface 42*b*, the position reference hole 47 is formed, after quenching of the main body member 4, with use of the same processing reference as those for the upper load rolling surface 42*a* and the lower load rolling surface 42*b*. Specifically, after the quenching of the main body member 4 is finished, a reference surface 49 (see FIGS. 1 and 2) is formed on a side surface of each leg portion 4*b* of the main body member 4, and the mounting surface 41 is formed on the horizontal portion 4*a*. The position reference hole 47 is formed by boring and the upper load rolling surface 42*a* and the lower load rolling surface 42*b* are formed by grinding with the reference surface 49 and the mounting surface 41 set as the processing reference. When the position reference hole 47, the upper load rolling surface 42*a*, and the lower load rolling surface 42*b* are formed with use of the same processing reference as described above, the positional accuracy of the position reference hole 47 relative to the upper load rolling surface 42*a* and the lower load rolling surface 42*b* becomes higher.

When the positioning protrusion 66 of the direction change pipe 8 is merely fitted into the position reference hole 47, on the other hand, the direction change pipe 8 has a degree of freedom of rotation about the position reference hole 47. In the first embodiment, however, when the lid member 5 is mounted on the main body member 4, the direction change pipes 8 of the circulation path modules 6 are received in the receiving grooves 50 and 51 of the lid member 5, and the rotation restriction protruding portions 68 formed on the direction change pipes 8 are fitted into the receiving grooves 50 and 51, respectively, so that the lid member 5 prevents the rotation of each of the circulation path modules 6 about the positioning protrusion 66.

Figure 13:
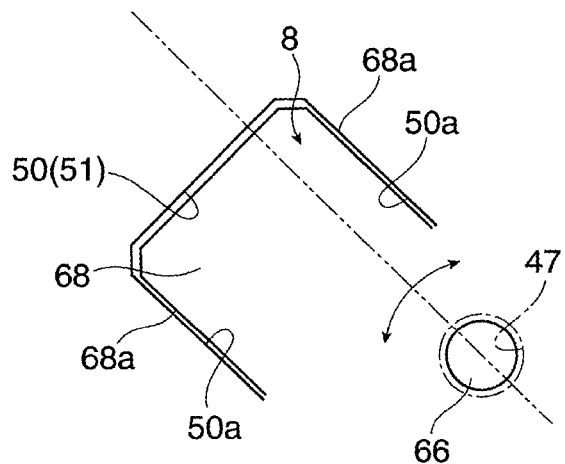
FIG. 13 is a schematic view illustrating a structure for positioning the circulation path module relative to the main body member according to the first embodiment.

FIG. 13 is a schematic view illustrating a relationship between the rotation restriction protruding portion 68 and each of the receiving grooves 50 and 51 of the lid member 5 about the positioning protrusion 66. As described above, the direction change pipe 8 is rotatable about the positioning protrusion 66 press-fitted into the position reference hole 47 of the main body member 4, and hence the rotation restriction protruding portion 68 formed on the outer wall portion of the direction change pipe 8 is movable along an arc in the arrow directions about the positioning protrusion 66. However, the lid member 5 is fixed to the main body member 4 from above the direction change pipe 8, and thus the rotation restriction protruding portion 68 is fitted into each of the receiving grooves 50 and 51 formed in the lid member 5, to thereby prevent the movement of the rotation restriction protruding portion 68 in the arrow directions. Specifically, the pair of restriction surfaces 68*a* formed on the rotation restriction protruding portion 68 abuts on the pair of locking surfaces 50*a* formed in each of the receiving grooves 50 and 51 so that each of the receiving grooves 50 and 51 restricts the movement of the direction change pipe 8 along the arrow directions.

As described above, in the rolling guide device of the first embodiment, the circulation path module 6 is mounted on the main body member 4, and the lid member 5 is further mounted on the main body member 4 from above the circulation path module 6. Thus, it is possible to secure the positional accuracy of the circulation path module 6 relative to the main body member 4.

Further, as illustrated in FIG. 5, the rotation restriction protruding portion 68 is formed on the outer wall portion of the direction change pipe 8 incorporating the inner direction change path 60-1. The rotation restriction protruding portion 68 is positioned on an outer side of the connection portion between the direction change pipe 8 and the return path pipe 7, which corresponds to a position farthest from the intersection position between the inner direction change path 60-1 and the outer direction change path 60-2. That is, the rotation restriction protruding portion 68 is formed on the outer wall portion of the direction change pipe 8 at a position sufficiently distanced from the positioning protrusion 66. Also in this respect, it is possible to reliably prevent the rotation of the direction change pipe 8 about the positioning protrusion 66 by fitting the rotation restriction protruding portion 68 into each of the receiving grooves 50 and 51 of the lid member 5.

Still further, in the rolling guide device of the first embodiment, the inner diameters of the upper through hole 45*a* and the lower through hole 45*b* are set larger than the outer diameter of the return path pipe 7 so that the insertion of the return path pipe 7 of the circulation path module 6 into the upper through hole 45*a* or the lower through hole 45*b* of the main body member 4 does not adversely affect the positioning of the circulation path module 6 and therefore the positioning of the direction change pipe 8. That is, the return path pipe 7 does not hinder the positioning of the direction change pipe 8 relative to the main body member 4 with use of the positioning protrusion 66 and the rotation restriction protruding portion 68. The return path pipe 7 inserted into the through hole 45*a* or 45*b* of the main body member 4 has its distal end fitted into the direction change pipe 8 of the circulation path module 6 mounted on the main body member 4 from the opposite side, and hence, in other words, both ends of the return path pipe 7 in its longitudinal direction are supported by the pair of direction change pipes 8 positioned with high accuracy relative to the main body member 4. Thus, the endless circulation path for the rollers 1 is formed with high accuracy, thereby being capable of achieving smooth circulation of the rollers 1.

Figure 14:
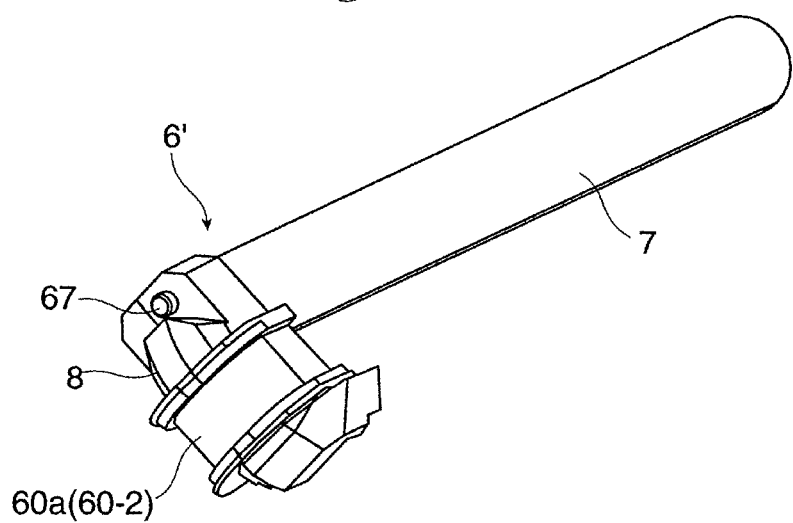
FIG. 14 is a perspective view illustrating a circulation path module according to a second embodiment of the present invention.
Figure 15:
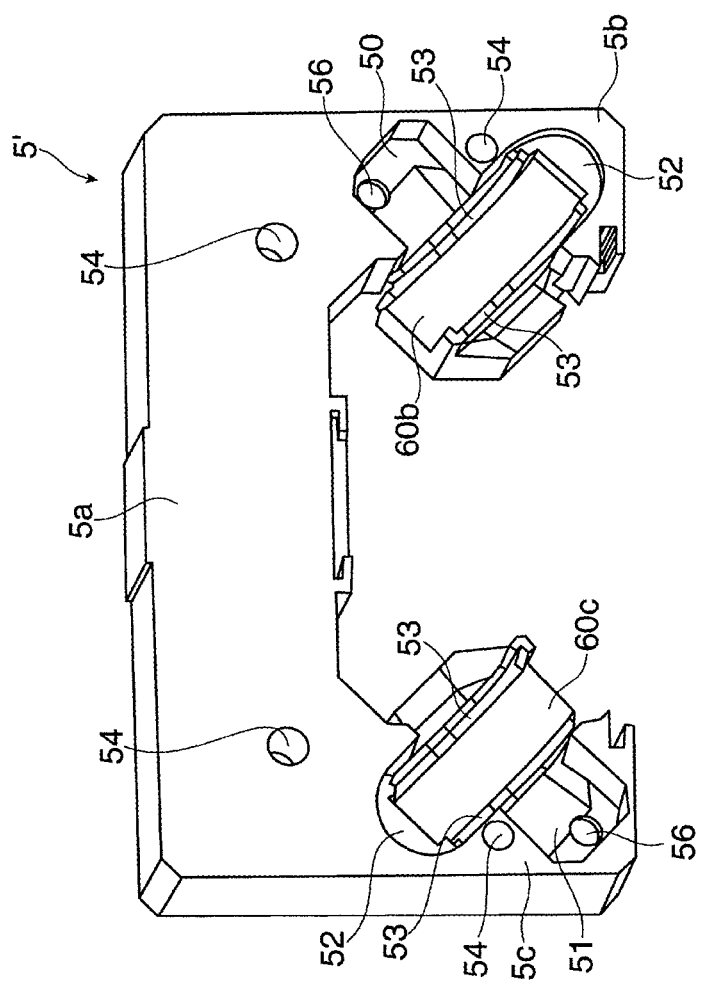
FIG. 15 is a perspective view illustrating a lid member according to the second embodiment.

FIG. 14 is a perspective view illustrating the circulation path module according to a second embodiment of the present invention. In the circulation path module 6' according to the second embodiment, a columnar restriction protrusion 67, which protrudes toward the lid member, is formed on the outer wall portion of the direction change pipe 8. This protrusion 67 corresponds to the rotation restriction protruding portion of the present invention. On the other hand, FIG. 15 illustrates a lid member 5' to be assembled to the circulation path module 6' of FIG. 14 according to the second embodiment. The lid member 5' has a locking hole 56 formed in each of the receiving grooves 50 and 51, for allowing the restriction protrusion 67 to be fitted thereinto. When the lid member 5' is mounted on the main body member 4, the restriction protrusion 67 formed upright on the direction change pipe 8 is fitted into the locking hole 56 formed in the lid member 5', to thereby prevent the rotation of the direction change pipe 8 about the positioning protrusion 66. Note that, the structure of the circulation path module 6' of FIG. 14 except for the restriction protrusion 67 is the same as that of the circulation path module 6 of the above-mentioned first embodiment, and the structure of the lid member 5' of FIG. 15 except for the locking hole 56 is the same as that of the lid member 5 of the above-mentioned first embodiment. Therefore, the same reference symbols as those of the first embodiment are placed in the figures, and detailed description thereof is omitted herein. Further, the restriction protrusion 67 may have a shape other than the columnar shape as long as the restriction protrusion 67 is formed upright on the outer wall portion of the direction change pipe 8.

Figure 16:
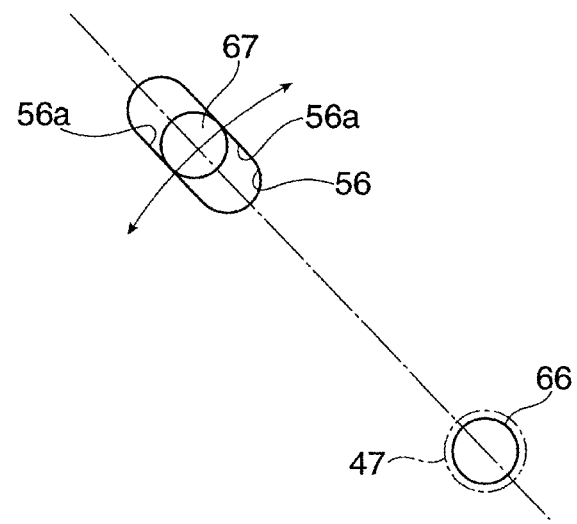
FIG. 16 is a schematic view illustrating a structure for positioning the circulation path module relative to a main body member according to the second embodiment.

FIG. 16 is a schematic view illustrating a positional relationship between the restriction protrusion 67 and the locking hole 56 about the positioning protrusion 66. As described above, the circulation path module 6' is rotatable about the positioning protrusion 66 press-fitted into the position reference hole 47 of the main body member 4, and hence the restriction protrusion 67 formed upright on the circulation path module 6' is movable along an arc in the arrow directions about the positioning protrusion 66. However, the lid member 5' is fixed to the main body member 4 from above the circulation path module 6', and thus the restriction protrusion 67 is fitted into the locking hole 56 formed in the lid member 5', to thereby prevent the movement of the restriction protrusion 67 in the arrow directions. The locking hole 56 is formed as an elongated hole, which is elongated along a line connecting the positioning protrusion 66 and the restriction protrusion 67 (chain line of FIG. 16), and the width dimension of the locking hole 56 in a direction orthogonal to that of this line is set to such a dimension that the restriction protrusion 67 is fitted into the locking hole 56 without a gap. Therefore, the rotation of the circulation path module 6' about the positioning protrusion 66 is prevented reliably while facilitating the fitting of the restriction protrusion 67 into the locking hole 56 when the lid member 5' is to be mounted on the main body member 4 so as to cover the circulation path module 6'. Thus, it is possible to secure the positional accuracy of the circulation path module 6' relative to the main body member 4. That is, in the example of FIG. 16, two sides 56*a* of the elongated hole 56, which are opposed to each other across the restriction protrusion 67, function as the locking surfaces for restricting the movement of the direction change pipe 8 in the arrow directions.

Note that, the direction change pipe 8 is loosely fittable into each of the receiving grooves 50 and 51 so that the fitting of the direction change pipe 8 into each of the receiving grooves 50 and 51 does not adversely affect the positioning of the circulation path module 6' when the restriction protrusion 67 formed upright on the direction change pipe 8 of the circulation path module 6' is to be fitted as described above into the locking hole 56 formed in each of the receiving grooves 50 and 51 of the lid member 5'.

Further, as illustrated in FIG. 14, the restriction protrusion 67 is formed upright on the outer wall portion of the direction change pipe 8 incorporating the inner direction change path 60-1. The restriction protrusion 67 thus formed upright is positioned away from the intersection position between the inner direction change path 60-1 and the outer direction change path 60-2, that is, positioned in the vicinity of an end edge of the direction change pipe 8. That is, the restriction protrusion 67 is formed on the outer wall portion of the direction change pipe 8 at a position sufficiently distanced from the positioning protrusion 66. Also in this respect, it is possible to reliably prevent the rotation of the circulation path module 6' about the positioning protrusion 66 by fitting the restriction protrusion 67 into the locking hole 56 of the lid member 5'.

Still further, both of the positioning protrusion 66 and the restriction protrusion 67 formed on the circulation path module 6' are formed on the first half circulation segment 6A of the circulation path module 6', but are not formed on the second half circulation segment 6B. Therefore, at the time of positioning the circulation path module 6' relative to the main body member 4 with use of the positioning protrusion 66 and the restriction protrusion 67, only the first half circulation segment 6A is virtually positioned with high accuracy relative to the main body member 4, and the second half circulation segment 6B is only assembled to the first half circulation segment 6A positioned with high accuracy relative to the main body member 4. That is, the assembly error between the first half circulation segment 6A and the second half circulation segment 6B does not adversely affect the positioning of the circulation path module 6' relative to the main body member 4. Also in this respect, the circulation path module 6' can be positioned with high accuracy relative to each of the upper load rolling surface 42a and the lower load rolling surface 42b of the main body member 4.

Figure 17:
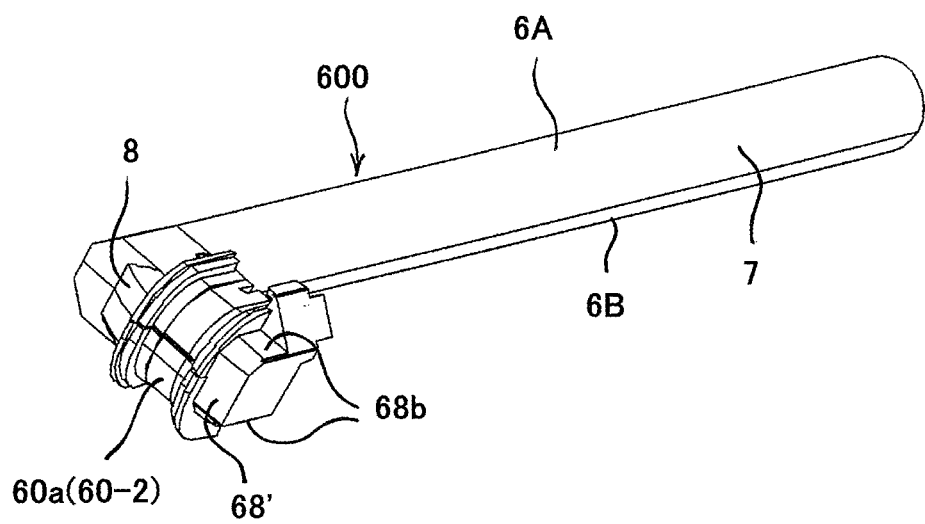
FIG. 17 is a perspective view illustrating a circulation path module according to a third embodiment of the present invention.

Next, FIG. 17 is a perspective view illustrating the circulation path module according to a third embodiment of the present invention. Similarly to the above-mentioned first embodiment, in a circulation path module 600 according to the third embodiment, a rotation restriction protruding portion 68' is formed on the outer wall portion of the direction change pipe 8. Note that, in the first embodiment illustrated in FIG. 5, the rotation restriction protruding portion 68 is formed on the outer side of the connection portion between the direction change pipe 8 and the return path pipe 7, but in the third embodiment, the rotation restriction protruding portion 68' is formed on the outer wall portion of the direction change pipe 8 at a position opposite to the return path pipe 7 across the inner peripheral guide surface 60a. That is, the rotation restriction protruding portion 68' is formed in the vicinity of a connection portion between the load rolling surface 42 of the main body member 4 and the inner direction change path 60-1 formed inside the direction change pipe 8, and is formed integrally with the outer wall portion of the direction change pipe 8 so as to cover the outer peripheral portion of the direction change pipe, which has been formed into the cylindrical shape in the related art. Further, the rotation restriction protruding portion 68' has a pair of restriction surfaces 68b formed in parallel to each other so as to sandwich the direction change pipe 8, and the pair of restriction surfaces 68b has a substantially rectangular outer shape.

Figure 18:
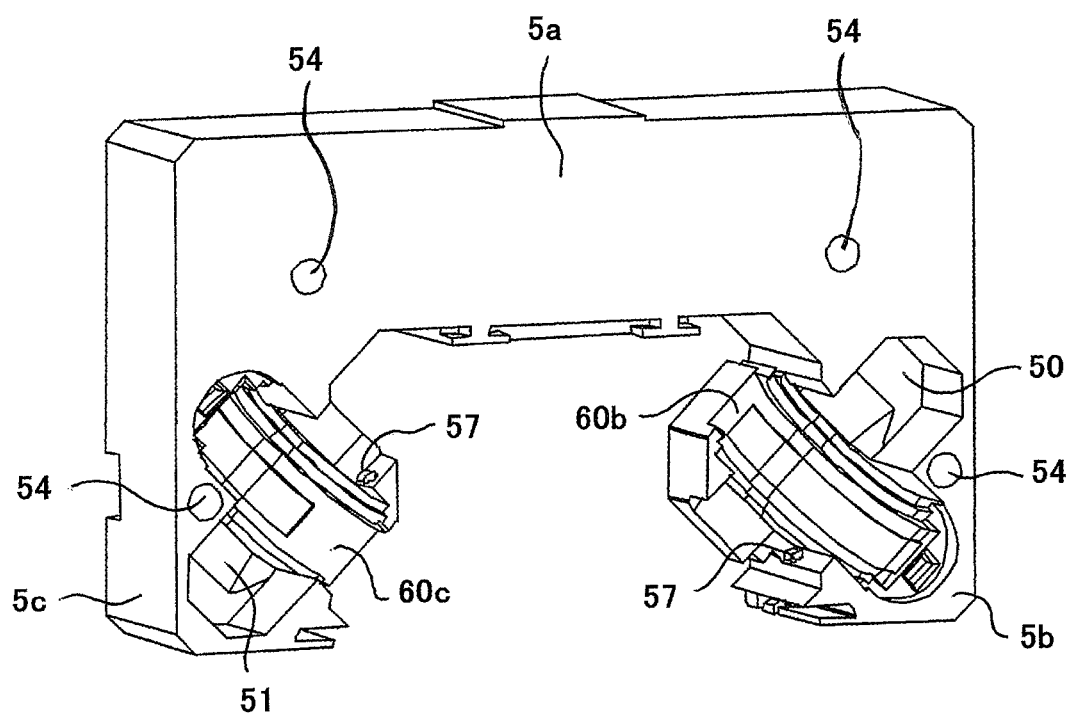
FIG. 18 is a perspective view illustrating a lid member according to the third embodiment.

On the other hand, FIG. 18 illustrates a lid member 500 to be assembled to the circulation path module 600 of FIG. 17 according to the third embodiment. Similarly to the above-mentioned first and second embodiments, the lid member 500 has the receiving grooves 50 and 51 for receiving the direction change pipe 8 of the circulation path module 600. The direction change pipe 8 is loosely fittable into each of the receiving grooves 50 and 51 so that the combination of the direction change pipe 8 and each of the receiving grooves 50 and 51 does not adversely affect the positioning of the circulation path module 600 relative to the main body member 4 when the direction change pipe 8 is inserted into each of the receiving grooves 50 and 51. That is, under a state in which the lid member 500 and the circulation path module 600 are combined with each other, a slight clearance is formed between the direction change pipe 8 and an inner wall of each of the receiving grooves 50 and 51.

Further, a pair of holding protrusions 57 opposed to each other are formed on the inner wall of each of the receiving grooves 50 and 51 at positions corresponding to the rotation restriction protruding portion 68' of the circulation path module 600. The pair of holding protrusions 57 are opposed to each other in each of the receiving grooves 50 and 51, and when the direction change pipe 8 of the circulation path module 600 illustrated in FIG. 17 is inserted into each of the receiving grooves 50 and 51, the rotation restriction protruding portion 68' is press-fitted between the pair of holding protrusions 57, and each of the holding protrusions 57 is brought into press contact with the pair of restriction surfaces 68b formed on the rotation restriction protruding portion 68'.

Note that, the structure of the circulation path module 600 of FIG. 17 except for the rotation restriction protruding portion 68' is the same as that of the circulation path module 6 of the above-mentioned first embodiment, and the structure of the lid member 500 of FIG. 18 except for the holding protrusions 57 is the same as that of the lid member 5 of the above-mentioned first embodiment. Therefore, the same reference symbols as those of the first embodiment are placed in the figures, and detailed description thereof is omitted herein.

Further, also in the circulation path module 600 of the third embodiment, when the circulation path module 600 is mounted on the main body member 4, as described above, the direction change pipe 8 is movable along an arc about the positioning protrusion 66 press-fitted into the position reference hole 47 of the main body member 4. When the lid member 500 is fixed to the main body member 4 from above the circulation path module 600, however, the direction change pipe 8 of the circulation path module 600 is received in each of the receiving grooves 50 and 51 of the lid member 5. At this time, the pair of holding protrusions 57 formed on the inner wall of each of the receiving grooves 50 and 51 sandwich the rotation restriction protruding portion 68' formed on the direction change pipe 8, to thereby prevent the movement of the direction change pipe 8 along an arc about the positioning protrusion 66. Specifically, the pair of holding protrusions 57 formed in each of the receiving grooves 50 and 51 abuts on the pair of restriction surfaces 68b formed on the rotation restriction protruding portion 68', to thereby restrict slight movement of the direction change pipe 8 in each of the receiving grooves 50 and 51.

Considering easiness of assembling work for the circulation path module 600 and the lid member 500, it is preferred that the direction change pipe 8 of the circulation path module 600 be fitted into each of the receiving grooves 50 and 51 of the lid member 500 with a clearance. In this case, however, the direction change pipe 8 may slightly move inside each of the receiving grooves 50 and 51, resulting in a risk in that the direction change path 60 cannot be positioned accurately relative to the load rolling surface 42 formed on the main body member 4. Further, the circulation path module 600 is obtained by combining the first half circulation segment 6A and the second half circulation segment 6B, and as illustrated in FIG. 7, the first half circulation segment 6A and the second half circulation segment 6B are assembled only by fitting the protrusions 65a into the holes 65b. Therefore, when any clearance is formed between the direction change pipe 8 and each of the receiving grooves 50 and 51 of the lid member 500, there is a risk in that the coupling between the first half circulation segment 6A and the second half circulation segment 6B is loosened. If the coupling between the first half circulation segment 6A and the second half circulation segment 6B is loosened, the widths of the inner direction change path 60-1 and the outer direction change path 60-2 are slightly increased, resulting in a higher risk in that the rollers 1 are skewed inside the direction change path 60.

In this respect, in the above-mentioned combination of the circulation path module 600 and the lid member 500 of the third embodiment, the direction change pipe 8 of the circulation path module 600 is fitted into each of the receiving grooves 50 and 51 of the lid member 500 with a clearance, but the pair of holding protrusions 57 formed in each of the receiving grooves 50 and 51 sandwich the rotation restriction protruding portion 68' formed on the direction change pipe 8, and hence the direction change pipe 8 does not slightly move inside each of the receiving grooves 50 and 51. Thus, the direction change path 60 can be positioned accurately relative to the load rolling surface 42 formed on the main body member 4 without impairing workability in assembling the circulation path module 600 and the lid member 500. In addition, the rotation restriction protruding portion 68', with which the holding protrusions 57 are brought into press contact, is formed in the vicinity of the connection portion between the load rolling surface 42 of the main body member 4 and the inner direction change path 60-1. Also in this respect, the inlet portion of the inner direction change path 60-1 on the load rolling surface 42 side can be positioned accurately relative to the load rolling surface 42 of the main body member 4.

Further, the pair of holding protrusions 57 formed in each of the receiving grooves 50 and 51 sandwich the rotation restriction protruding portion 68' of the circulation path module 600 along a direction of pressing the first half circulation segment 6A and the second half circulation segment 6B of the circulation path module 600 against each other, to thereby prevent the coupling between the first half circulation segment 6A and the second half circulation segment 6B from being loosened inside each of the receiving grooves 50 and 51. Thus, unintended increase in width of the direction change path 60 is prevented, thereby being capable of forestalling the skew of the rollers 1 inside the direction change path 60, and maintaining smooth circulation of the rollers 1 in the endless circulation path.

The invention claimed is:

1. A rolling guide device, comprising:
a track member; and
a moving member assembled to the track member through intermediation of a plurality of rolling elements, the moving member having a plurality of rolling-element endless circulation paths comprising inner direction change paths and outer direction change paths intersecting with each other,
wherein the moving member comprises:
a main body member having load rolling surfaces and return paths for the plurality of rolling elements;
direction change pipes, each incorporating one of the inner direction change paths, and having an inner peripheral guide surface for one of the outer direction change paths, respectively; and
lid members each being mounted on the main body member and having outer peripheral guide surfaces of the outer direction change paths,
wherein the main body member, to which the direction change pipes are fixed, has position reference holes formed therein so as to serve as position references for the direction change pipes, respectively,
wherein the direction change pipes have positioning protrusions formed thereon so as to be press-fitted into the position reference holes, respectively,
wherein the direction change pipes comprise rotation restriction protruding portions formed on outer wall portions of the inner direction change paths, respectively, for preventing rotation of the direction change pipes about the respective positioning protrusions when the lid members are fixed to the main body member,
wherein each of the rotation restriction protruding portions has a pair of restriction surfaces formed in parallel to each other so as to sandwich each of the direction change pipes, and
wherein each of the lid members has a pair of holding protrusions, each holding protrusion held in press contact with a respective restriction surface of the pair of restriction surfaces of the rotation restriction protruding portions.

2. The rolling guide device according to claim 1,
wherein the inner direction change path of each of the direction change pipes includes an opening which permits the plurality of rolling elements to move into or from a return path and an opening which permits the plurality rolling elements to move into or from a load path defined by the track member and the moving member, and
wherein each of the rotation restriction protruding portions is formed at a position which is nearer to the opening which permits the plurality rolling elements to move into or from the load path defined by the track member and the moving elements than the opening which permits the plurality of rolling elements to move into or from the return path.

3. The rolling guide device according to claim 2,
wherein the each of the direction change pipes comprises a first half circulation segment and a second half circulation segment divided in a plane including one of the inner direction change paths, and
wherein the pair of holding protrusions formed on the each of the lid members is held in press contact with the pair of restriction surfaces of the each of the rotation restriction protruding portions along a direction of pressing the first half circulation segment and the second half circulation segment against each other.

4. A rolling guide device, comprising:
a track member; and
a moving member assembled to the track member through intermediation of a plurality of rolling elements, the moving member having a plurality of rolling-element endless circulation paths comprising inner direction change paths and outer direction change paths intersecting with each other,
wherein the moving member comprises:
a main body member having load rolling surfaces and return paths for the plurality of rolling elements;
direction change pipes, each incorporating one of the inner direction change paths, and having an inner peripheral guide surface for one of the outer direction change paths, respectively; and
lid members each being mounted on the main body member and having outer peripheral guide surfaces of the outer direction change paths,
wherein the main body member, to which the direction change pipes are fixed, has position reference holes formed therein so as to serve as position references for the direction change pipes, respectively,
wherein the direction change pipes have positioning protrusions formed thereon so as to be press-fitted into the position reference holes, respectively,
wherein the direction change pipes comprise rotation restriction protruding portions formed on outer wall portions of the inner direction change paths, respectively, for preventing rotation of the direction change pipes about the respective positioning protrusions when the lid members are fixed to the main body member,
wherein the rotation restriction protruding portions each include a columnar restriction portion which has a columnar shape and protrudes toward the lid members from the outer wall portions of a respective one of the inner direction change paths of a respective one of the direction change pipes, wherein each of the lid members has receiving grooves for the direction change pipes, and wherein the receiving grooves each have a locking hole formed therein, such that the columnar restriction portions are fitted into the locking holes, respectively.

5. The rolling guide device according to claim 4, wherein each of the locking holes is formed as an elongated hole, the hole being elongated along a line connecting a respective positioning protrusion and a columnar restriction portion in a respective one of the direction change pipes.

6. The rolling guide device according to claim 5, wherein each of the direction change pipes comprises a first half circulation segment and a second half circulation segment divided in a plane including one of the inner direction change paths, and wherein the each of the positioning protrusions and the each of the rotation restriction protruding portions are formed on the first half circulation segment.

* * * * *